US005450778A

United States Patent [19]

Roberts

[11] Patent Number: 5,450,778

[45] Date of Patent: * Sep. 19, 1995

[54] GUITAR SLIDE

[76] Inventor: Jeffrey A. Roberts, 12851 Floral Ave., Apple Valley, Minn. 55124

[ * ] Notice: The portion of the term of this patent subsequent to Oct. 12, 2010 has been disclaimed.

[21] Appl. No.: 92,774

[22] Filed: Jul. 16, 1993

Related U.S. Application Data

[63] Continuation-in-part of Ser. No. 755,788, Sep. 6, 1991, Pat. No. 5,251,527.

[51] Int. Cl.$^6$ .......... G01D 3/00
[52] U.S. Cl. .......... 84/319
[58] Field of Search .......... 84/319, 318, 317, 316, 84/315

[56] References Cited

U.S. PATENT DOCUMENTS

| | | | |
|---|---|---|---|
| 3,741,065 | 6/1973 | Harris | 84/319 |
| 4,171,659 | 10/1979 | Tumminaro | 84/319 |
| 4,790,232 | 12/1988 | Rosen | 84/319 |
| 4,969,382 | 11/1990 | Hein, III et al. | 84/319 |
| 5,251,527 | 10/1993 | Roberts | 84/319 |

*Primary Examiner*—Micheal L. Gellner
*Assistant Examiner*—Cassandra Spyrou
*Attorney, Agent, or Firm*—Hugh D. Jaeger

[57] ABSTRACT

A guitar slide which includes a generally tubular body having a conical outer surface tapering downward from a first open finger receiving end to a second smaller end. The outer surface and the inner surface are both preferably conical. The body is machined of an alloy. In another embodiment, the guitar slide is provided with a domed end.

6 Claims, 3 Drawing Sheets

GUITAR SLIDE

CROSS REFERENCES TO APPLICATIONS

This patent application is a continuation-in-part of U.S. Ser. No. 07/755,788, filed Sept. 6, 1991, now U.S. Pat. No. 5,251,527 entitled "Guitar Slide" by the same inventor of the parent patent application.

BACKGROUND OF THE INVENTION

1. Field of the Invention

The present invention is a guitar slide having a conical body tapering from the base to a narrower end at the fingertip. In another embodiment of the present invention, there is provided a guitar slide with a domed end.

2'. Description of the Prior Art

Many types of slides have been used to obtain the slide blues sound on the guitar. This technique was developed from early one-stringed instruments, where the player would use a rock or pill bottle as a slider. Guitar players later used knives or broken off necks of bottles.

Modern guitar players still use wine bottle tops. Various materials have been used, such as metal socket wrenches or plights-glass slides. The various materials give different sounds and feels to the player. Most of these devices are cylindrical.

Many attempts have been made to improve upon these traditional devices. One device, shown in U.S. Pat. No. 3,741,065 to Harris, issued Jun. 26, 1973, shows an outwardly tapering body which is wider at the finger tip end. This device teaches removable inserts for finger sizing. Such outward tapers are unnatural in that they do not follow the normal human anatomy. Such a diverging shape gives the opposite feel to the normal human finger. A convex slide is illustrated in U.S. Pat. No. 4,969,382 to Hein, III, et al., issued Nov. 13, 1990. The convex exterior is designed for selectively depressing certain strings. Once again it does not have the naturally tapered shape of the finger and plays differently from traditional slides.

The present invention is a guitar slide which plays naturally, following the shape of the human finger, while giving the proper tone without noise or a buzz.

SUMMARY OF THE INVENTION

The general purpose of the present invention is a guitar slide which includes a generally tubular body having a conical outer surface tapering downward from a first open finger receiving end to a second smaller end. The outer surface and the inner surface are both preferably conical. In the preferred embodiment, the body is machined of solid brass. An alternative embodiment provides a guitar slide having a dome end for the actuation of notes individually.

A significant aspect and feature of the present invention is a flared shape which eliminates buzzing on the guitar strings.

Another significant aspect and feature of the present invention is to provide the appropriate weight of the brass alloyed body to promote vibrato and make the slide easy to move.

A further significant aspect and feature of the present invention is to provide a minimum diameter at a second end which allows accuracy in picking out particular strings.

Still another significant aspect and feature of the present invention is to provide flared shape which holds the slide on the finger of the user, while allowing comfort where the radiused edges contact the hand.

Yet a further significant aspect and feature of the present invention is to provide a structure of the present invention which may be made in various sizes to fit different fingers or different users.

Yet another significant aspect and feature of the present invention is to provide a flared first section on the guitar slide which fits against adjacent fingers when in use so that the contact with the other finger maintains the guitar slide in position.

Still yet another significant aspect and feature of the present invention is a guitar slide having a domed end for the actuation of individual notes.

Having thus described the embodiments of the present invention, it is a principal object hereof to provide a guitar slide.

Another object of the present invention is a guitar slide with a dome end.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
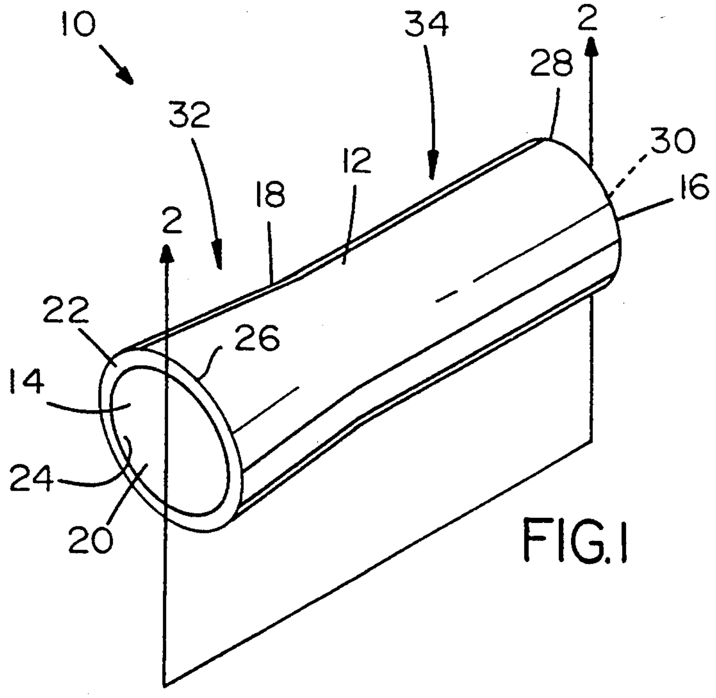
FIG. 1 illustrates a perspective view of the slide constructed according to the present invention.

A slide 10, constructed according to the present embodiment, includes a generally tubular body 12. The body 12 has a first open finger-receiving end 14 and a second end 16. The second end 16 is preferably open as in the illustrated embodiment. The body 12 has a generally conical shape. The body 12 has an outer surface 18 and an inner surface 20. The outer surface 18 and the inner surface 20 taper from first finger-receiving end 14 to the second end 16, preferably at an angle of 1° 54 minutes. Those skilled in the art may vary this angle for particular finger fits.

In the illustrated embodiment, the body 12 has a wall thickness at first finger-receiving end 14 of approximately 0.1525 inches, and a wall thickness at second end 16 of approximately 0.1125 inches.

The body 12 is preferably machined of solid brass or an alloy thereof. In the preferred embodiment, a brass alloy constructed of CDA 360 (35.2% Zinc, 61.5% Copper, and 3.3% Lead). A solid brass body 12 has sufficient weight to promote vibrato and allow ease of movement along the strings. The brass alloy provides a good tone on the strings and minimizes noise. Lighter slides are susceptible to buzzing or noise. Greater control is given with the brass alloy.

Figure 2:
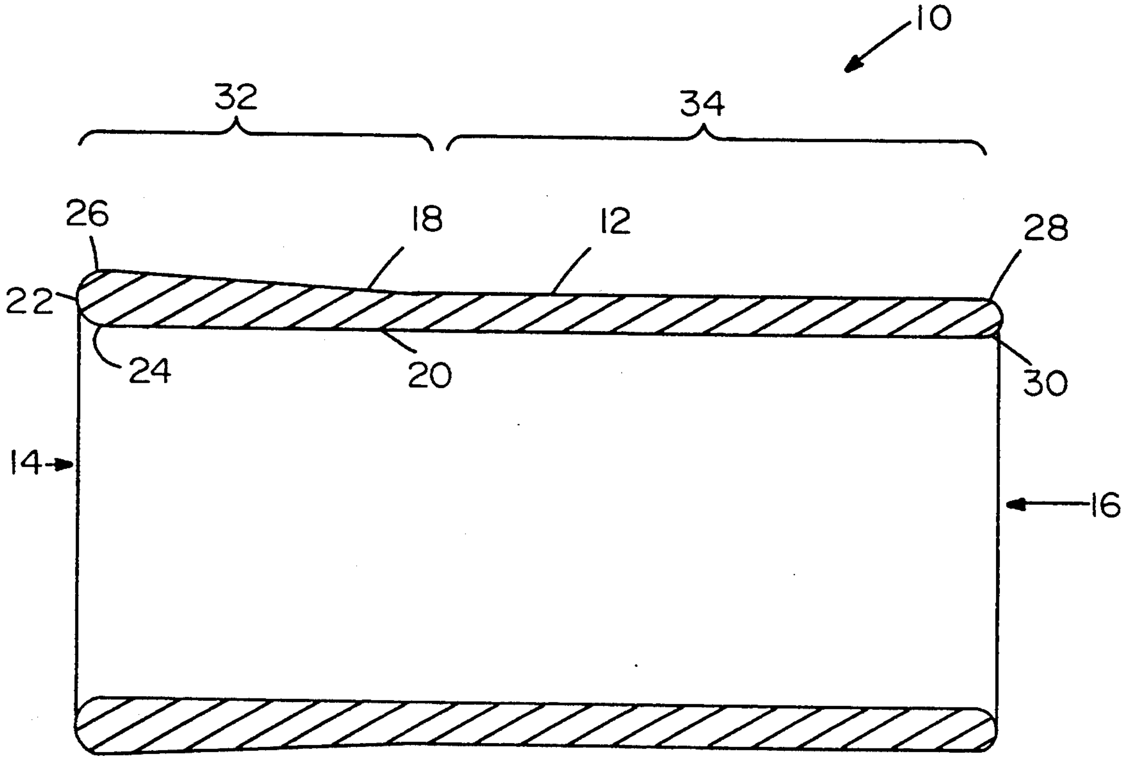
FIG. 2 illustrates a cross-sectional view taken along line 2—2 of FIG. 1.

At first finger-receiving end 14 of tubular body 12, there is a flat end section 22 extending around finger-receiving end 14 having a width of approximately 0.0625 inches. Tubular body 12 has an inner radiused edge 24 and an outer radiused edge 26. Edges 24 and 26 preferably have a 0.140 radius. At the second end 16, body 12 has an outer edge 28 which is machined at a tangent with a 0.047 radius. Body 12 has an inner edge 30 having a full 0.078 radius as illustrated in FIG. 2. In the preferred embodiment, the body 12 is approximately 2.5 inches long.

FIG. 2 illustrates a cross-sectional view taken along line 2—2 of FIG. 1 where all numerals correspond to those elements previously described.

MODE OF OPERATION

In the preferred embodiment, the body 12 has a first section 32 which tapers from the thickness described at finger-receiving end 14 to the narrower thickness. The body 12 has a second section 34 which has a constant thickness between section 32 and second end 16. In one preferred embodiment, outer surface 18 tapers through first section 32, and is generally constant in diameter through second section 34.

The structure of the present invention has many advantages over prior art devices. The flared shape eliminates buzzing on the guitar strings. The weight of the brass alloyed body promotes vibrato and makes it easy to move.

The minimum diameter at the second end 16 allows accuracy in picking out particular strings.

The flared shape holds the slide 10 on the finger of the user, while allowing comfort where the radiused edges 24 and 26 contact the hand.

The structure of the present invention may be made in various shapes to fit different fingers or different users. For example, in the illustrated embodiment with the flared outer surface 18 and cylindrical inner surface 20, common diameters are 0.6875, 0.750, 0.8125, 0.875, 0.9375, and 1 inches.

The flared first section 32 of slide 10 fits against the adjacent finger when in use so that the contact with the other finger maintains the slide 10 in position. Prior art cylindrical devices or outwardly tapered devices would be prone to slide off the finger when contacting adjacent fingers. Flared first section 32 fits nicely against adjoining fingers for a secure fit.

DESCRIPTION OF A FIRST ALTERNATIVE EMBODIMENT

Figure 3:
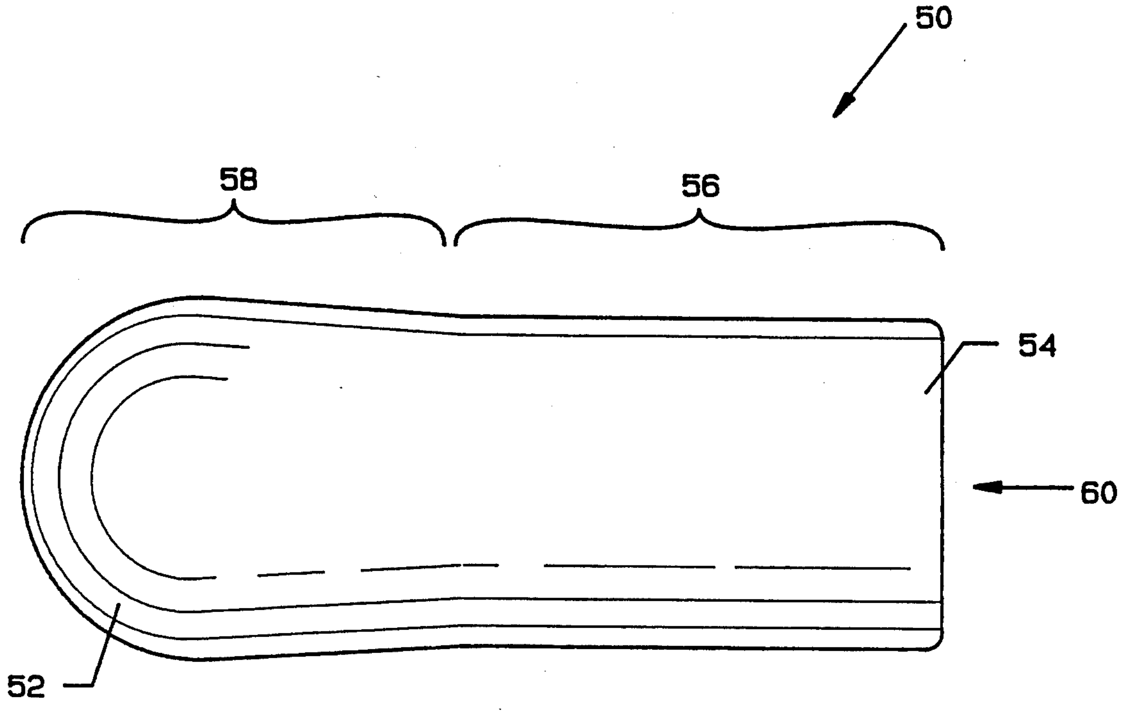
FIG. 3, a first alternative embodiment, illustrates a side view of a guitar slide having a dome end; and, FIG. 4 illustrates a cross-sectional view along line 4—4 of FIG. 3.

FIG. 3, a first alternative embodiment, illustrates a guitar slide 50 constructed in accordance with many of the features of the guitar slide 10 illustrated in FIG. 1, and which also includes a dome end 52. The one-piece body 54 is generally tubular in shape having a surface 56 being of constant diameter, which intersects another surface 58 which tapers and aligns between the constant diameter surface 56 and the dome end 52 whose diameter conforms to that of the largest diameter of the tapered surface 58. A finger receiving end 60 accommodates a finger of one's hand at one end of the body 54.

Figure 4:
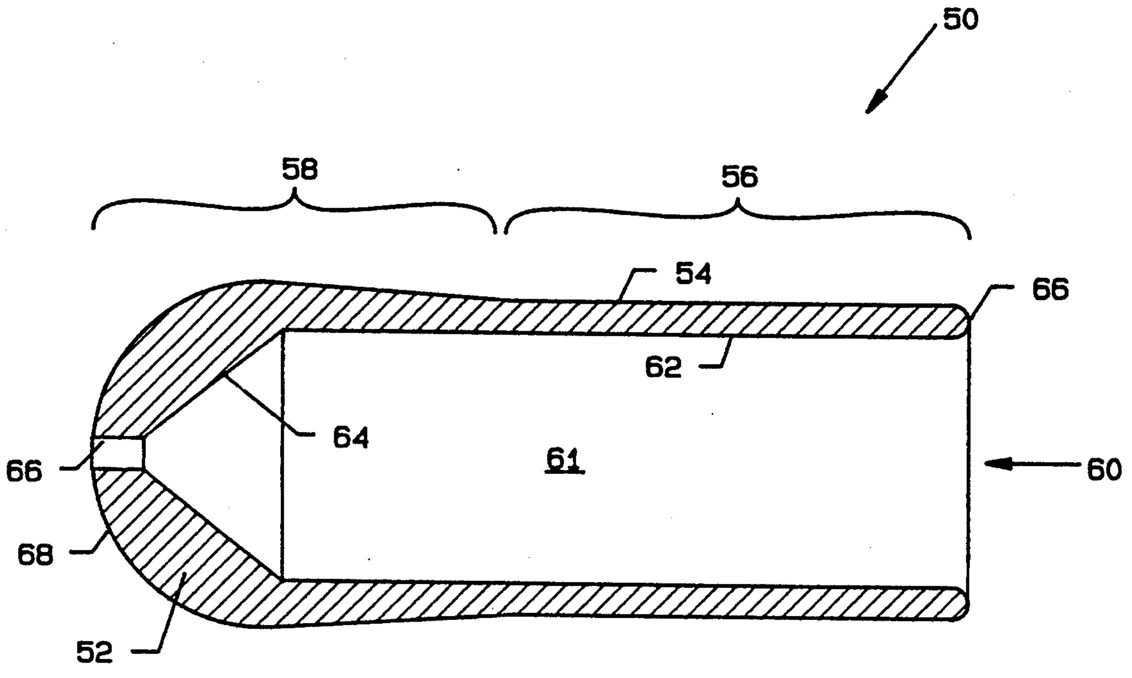

FIG. 4 illustrates a cross-sectional view along line 4—4 of FIG. 3 where all numerals correspond to those elements previously described. The interior 61 of the body 54 includes a constant radius cylindrical surface 62, a conical surface 64 and a hole 66 extending from the interior through the dome end 52. The hole 66, extending through the dome end 52 assists in easy removal of the guitar slide 50 from one's finger should sweat tend to cause a hydraulic and/or pressure lock between the finger and the interior 61 of the guitar slide 50. The body 54 includes a radiused annular surface 66 at the edge of the finger receiving end 60 to provide for comfortable fitting of one's finger at the finger receiving end 60.

MODE OF OPERATION OF THE FIRST ALTERNATIVE EMBODIMENT

The interior 61 of the guitar slide 50 accommodates a finger of one's hand through the finger receiving end 60. Downward fretting pressure is applied to the guitar slide 50 to simultaneously depress the strings of the guitar or other fretted string instrument adjacent to a fret on the neck of an instrument. Often, individual notes are required to be played. For individual note playing, the curved surface 68 is brought into contact with an individual string adjacent to an appropriate fret by tipping the cording hand finger upwardly subsequent to removing the constant diameter surface 56 and the tapered surface 58 from mass engagement with all of the guitar strings. Return to bar fretting occurs simply and rapidly by tipping the cording hand finger downwardly for engagement with the complete number of strings.

Various modifications can be made to the present invention without departing from the apparent scope hereof.

I claim:

1. A guitar slide comprising:

a. a solid generally tubular body;

b. a first end on the body including a dome over said first end;

c. a second end on the body;

d. the body having a first conical section tapering from a first diameter adjacent to the first end to a second narrower diameter; and, e. a second section adjacent the second end having a generally constant diameter.

2. The guitar slide of claim 1 wherein said body is brass.

3. The guitar slide of claim 2 wherein the brass is an alloy made of CDA 360 (35.2% Zinc, 61.5% Copper, and 3.3% Lead).

4. A guitar slide comprising:

a. solid generally tubular body;

b. a first open end on the body;

c. a finger receiving second end on the body;

d. the body having a first conical section tapering from a first diameter adjacent to the first end to a second narrower diameter; and, e. a second section adjacent the second end having a generally constant diameter.

5. The guitar slide of claim 4 wherein said body is brass.

6. The guitar slide of claim 5 wherein the brass is an alloy made of CDA 360 (35.2% Zinc, 61.5% Copper, and 3.3% Lead).

* * * * *